US007986323B2

(12) United States Patent
Kobayashi et al.

(10) Patent No.: US 7,986,323 B2
(45) Date of Patent: Jul. 26, 2011

(54) TWO DIMENSIONAL USER INTERFACE FOR MULTIDIMENSIONAL DATA ANALYSIS

(75) Inventors: Yoshiaki Kobayashi, Tokyo (JP); Hiroyuki Miyajima, Yamato (JP); Masaru Yamamoto, Sagamihara (JP); Yoshiaki Sawano, Zama (JP)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/428,686

(22) Filed: Jul. 5, 2006

(65) Prior Publication Data

US 2008/0007554 A1    Jan. 10, 2008

(51) Int. Cl.
*G06T 11/20* (2006.01)
(52) U.S. Cl. ................. 345/440; 345/418; 345/440.2
(58) Field of Classification Search .............. None
See application file for complete search history.

(56) References Cited

U.S. PATENT DOCUMENTS

| | | | |
|---|---|---|---|
| 5,228,119 A * | 7/1993 | Mihalisin et al. | 345/418 |
| 6,750,864 B1 * | 6/2004 | Anwar | 345/440 |
| 7,269,542 B2 * | 9/2007 | Ruetsch | 703/22 |
| 7,283,664 B2 * | 10/2007 | Magee et al. | 382/165 |
| 7,318,053 B1 * | 1/2008 | Cha et al. | 1/1 |
| 7,629,975 B2 * | 12/2009 | Buck | 345/440.2 |
| 2003/0216939 A1 * | 11/2003 | Bito et al. | 705/2 |
| 2004/0054508 A1 * | 3/2004 | Mc Cabe et al. | 703/1 |
| 2004/0218806 A1 * | 11/2004 | Miyamoto et al. | 382/145 |
| 2006/0028471 A1 * | 2/2006 | Kincaid et al. | 345/440 |
| 2007/0198301 A1 * | 8/2007 | Ayers et al. | 705/3 |

FOREIGN PATENT DOCUMENTS

| | | |
|---|---|---|
| JP | 07-282087 | 10/1995 |
| JP | 2000-293281 | 10/2000 |
| JP | 2003-196302 | 7/2003 |

OTHER PUBLICATIONS

Hoffman, P., Grinstein, G., Pinkney, D., Dimensional anchors: a graphic primitive for multidimensional multivariate information visualizations, Nov. 1999, Proceedings of the 1999 workshop on new paradigms in information visualization and manipulation, pp. 9-16.*

* cited by examiner

*Primary Examiner* — Said Broome
(74) *Attorney, Agent, or Firm* — Lieberman & Brandsdorfer, LLC (57) ABSTRACT

Multiple two dimensional graphs are combined into a single two dimensional graph wherein correlations between dimensions are maintained. Dimensions in the graph can be superimposed on each other and displayed while maintaining the two dimensional format. This enables the two dimensional graph to be converted to three or more dimensions while maintaining the format and presentation in a two dimensional visual display.

18 Claims, 7 Drawing Sheets

TWO DIMENSIONAL USER INTERFACE FOR MULTIDIMENSIONAL DATA ANALYSIS

BACKGROUND OF THE INVENTION

1. Technical Field

This invention relates to multidimensional presentation of data in a two dimensional user interface. More specifically, the invention relates to manipulating the data to expand the presentation for three or more dimensions of data in the two dimensional user interface.

2. Description of the Prior Art

Scatter diagrams and cross tabulation tables are known in the art for presenting and analyzing multidimensional data. A scatter diagram is a graph used in statistics to visually display and compare two or more sets of related quantitative, or numerical, data by displaying only finitely many points, each having a coordinate on a horizontal and a vertical axis. With respect to analyzing multidimensional data, the form of presenting multidimensional data has been limited to that based on a cross section defined by two dimensions selected from multiple dimensions. For example, the level of detail in a certain dimension is changed using drill-up and drill-down functions, wherein two dimensions are selected from multiple dimensions and the horizontal and vertical axes are interchanged using slice and dice functions. However, the presentation of the multidimensional data is limited to a cross section defined by two dimensions from multiple dimensions. Accordingly, with the limitations of the prior art it has been difficult to see correlations between other dimensions.

In addition, data analysis in general is an acquired and specialized skill. Two separate roles exists in data analysis, including a data analyst who analyzes data and a salesperson who uses and benefits from the result of the data analysis. The data analyst serves the role between the original data and the salesperson. The separation of the roles reduces the ability for a quick response to a change in the data. With changes in technology and an increase in the speed of communication, it is desirable to modify the data analysis and make it more intuitive so that a person other than the data analyst, such as the salesperson, can respond quickly to changes in data.

Therefore, there is a need for data analysis and presentation that supports intuitive manipulation of data. The presentation of data should support presentation of multiple data dimensions in a two dimensional format.

SUMMARY OF THE INVENTION

This invention comprises a method and system for utilizing a graph to present multi-dimensional data in a two dimensional format In one aspect of the invention, a method is provided to present multidimensional data in a single graph in a single visual display. Multiple two dimensional summary graph are displayed in combination on a visual display as a single graph. In this graph, correlations between dimensions are visualized. A logical operator is applied to at least two dimensions of the combined single graph to superimpose the selected dimensions in the single graph. In one embodiment, the logical operator may be in the form of an AND logical operator, an OR logical operator, or a combination thereof.

In another aspect of the invention, a computer system is provided with a processor in communication with storage media, and a data processing tool in communication with the processor. The data processing tool includes instructions to display multiple two dimensional graphs in a visual display as a single graph wherein correlation between dimensions is maintained. In addition, the data processing tool includes instructions to apply a logical operator to at least two dimensions in the graph. When a logical operator is application to the select dimensions of the graph, the instructions superimpose the selected dimensions in the graph.

In yet another aspect of the invention, an article is provided with a computer readable medium. Instructions in the medium are provided for displaying multiple two dimensional summary graphs in combination on a visual display as a single graph so that correlations between dimensions are visualized. In addition, instructions in the medium are provided for applying a logical operator to at least two dimensions of the combined single graph to superimpose the selected dimensions in the single graph.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Details

Figure 1:
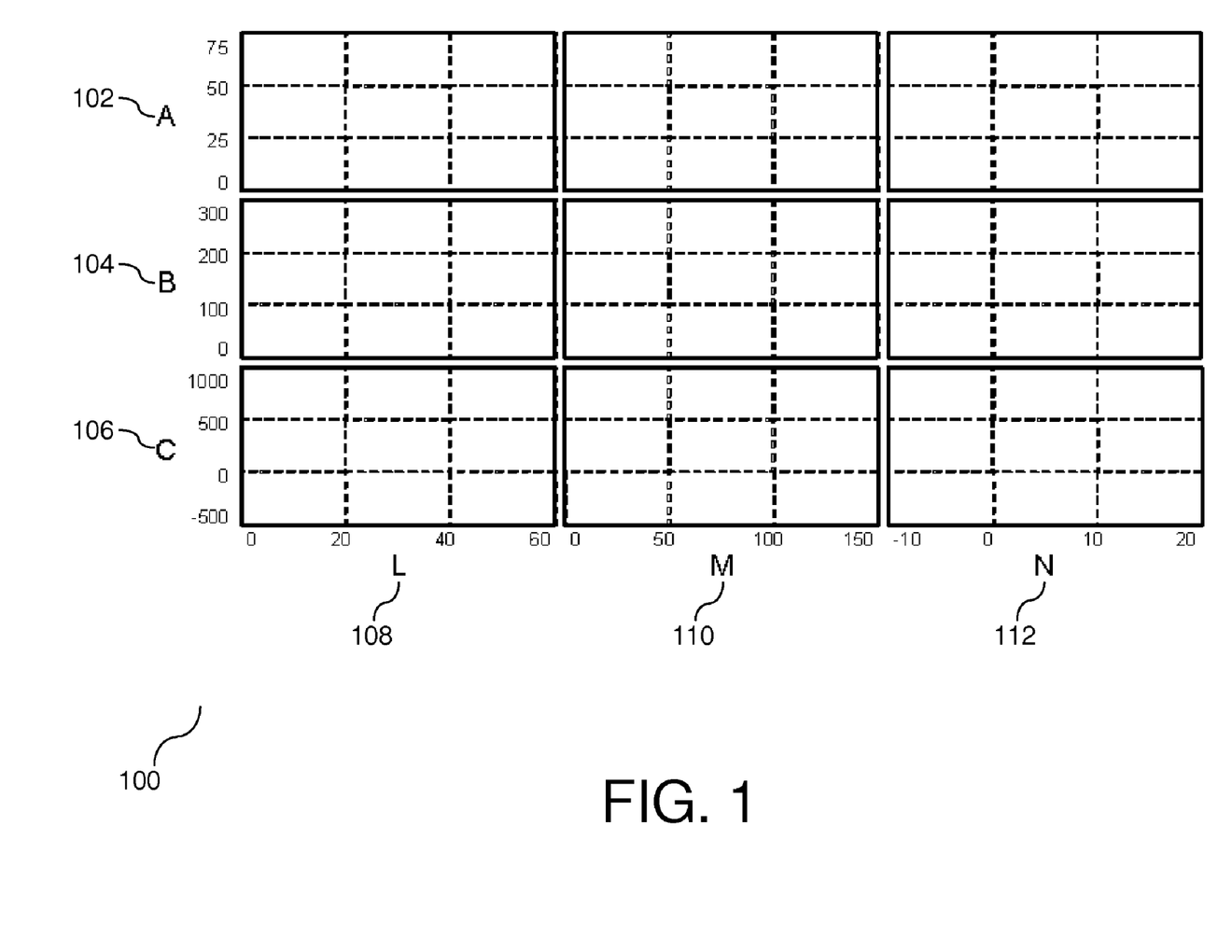
FIG. 1 is a block diagram of single visual display matrix.

A conventional scatter diagram is modified so that various cross sections of data can be displayed on a visual display in a summarized format at the same time. In the initial state prior to presenting the data, the length of one dimension in the direction of the corresponding axis is obtained by dividing the length of the axis by the number of dimensions on the axis. This ensures that the dimensions do not overlap when displayed. FIG. 1 is a block diagram (100) illustrating an example of a single visual display of six dimensions. As shown in this example, the dimensions are divided into two groups. The first group includes dimensions A (102), B (104), and C (106). The second group includes dimensions L (108), M (110), and N (112). In this example, three types of dimensions are assigned to the horizontal axis, with each dimension having a length equal to one third of the length of the horizontal axis. Similarly, three types of dimensions are assigned to the vertical axis, with each dimensions having a length equal to one third of the length of the vertical axis. A total of six types of dimensions are selected in the example shown herein. In one embodiment, when pertinent dimensions can be classified into two groups, it is preferable that dimensions of the same type be assigned to the same axis for better viewability. Similarly, in one embodiment any number of dimensions can be assigned to each of the horizontal and vertical axes, and one dimensions can be located on both the horizontal and vertical axes. Accordingly, based on the sample matrix of FIG. 1 a frame of a scatter diagram is created.

Figure 2:
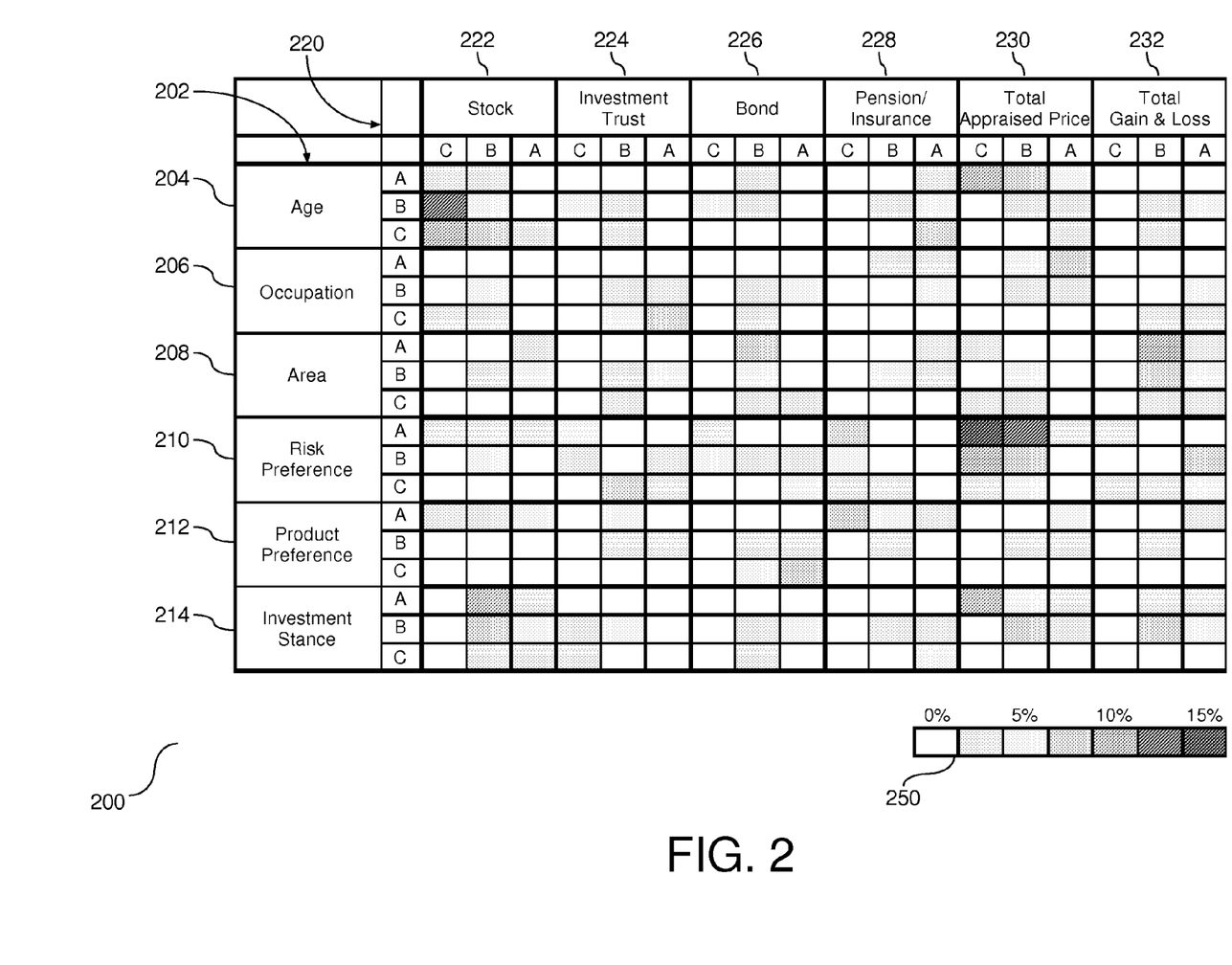
FIG. 2 is a block diagram of sample two dimensional matrix according to the preferred embodiment of this invention, and is suggested for printing on the first page of the issued patent.

Following the initial grouping of data and classification of dimensions, the matrix can be generated to populate the frame of the scatter diagram. FIG. 2 is a block diagram (200) showing a sample analysis of actual customer purchase rates in a sales campaign for a new product. The following six types of dimensions are shown on the vertical axis (202): age (204), occupation (206), area (208), risk performance (210), product preference (212), and investment stance (214). Similarly, the following six types of dimensions are shown in the horizontal axis (220): stock (222), investment trust (224), bond (226), pension/insurance (228), total appraised price (230), and total gain and loss (232). As shown in this example, each dimension is divided into three categories. For example, one two-dimensional area defined by the horizontal and vertical axes each corresponding to one dimension includes a total of nine cells. In one embodiment, each of these nine cells are individually color coded with colors and/or shades of colors with each cell color corresponding to amounts of data. A sample legend for the color coding is shown at (250). Accordingly, the presentation of the data enables the user to understand correlations between dimensions in comparison with the target values by comparing the colors and/or shades of color in the two-dimensional spaces in a summarized format.

Figure 3:
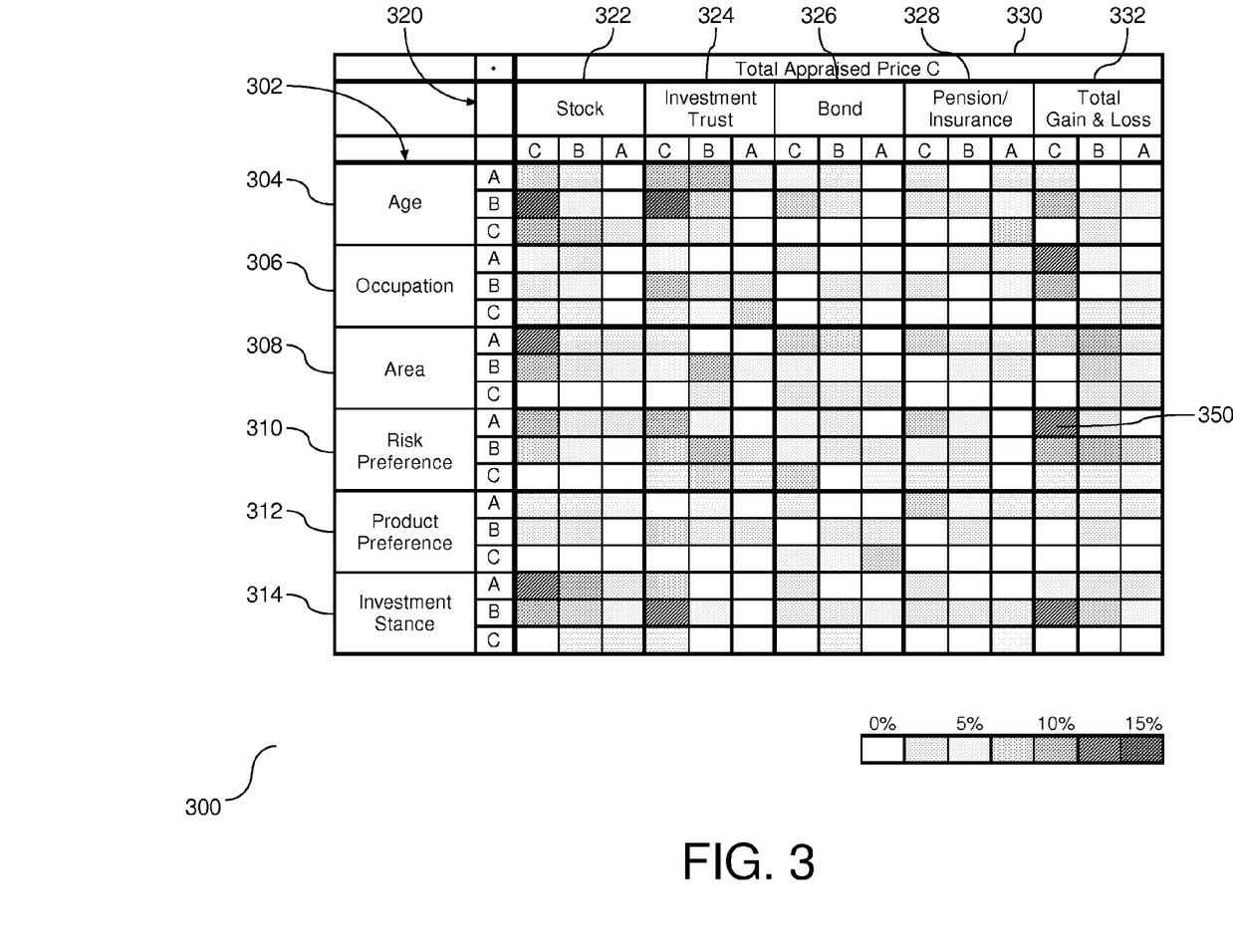
FIG. 3 is a block diagram of the matrix of FIG. 2 with superimposition in the direction of the horizontal axis.

As shown in FIG. 2, the two-dimensional matrix is created and populated with data. The user can select any cell in the matrix and superimpose the corresponding dimensions on each other through use of an AND logical operator. There are several options for superimposing cells in the matrix, including superimposition in the horizontal axis direction, superimposition in the vertical axis direction, and superimposition in both the horizontal and vertical axis directions. FIG. 3 is a block diagram (300) illustrating an example of the sample matrix (200) of FIG. 2 with superimposition in the direction of the horizontal axis. The following six types of dimensions are shown on the vertical axis (302): age (304), occupation (306), area (308), risk performance (310), product preference (312), and investment stance (314). Similarly, the following five types of dimensions are shown on the horizontal axis (320): stock (322), investment trust (324), bond (326), pension/insurance (328), and total gain and loss (332). In addition, the dimension of the total appraised price (330) has been applied to each dimension on the horizontal axis (320) through the AND operator. The horizontal axis (320) represents a state in which the ANDs of Total Appraised Price C and the other dimensions are performed. In one embodiment, the ANDs of the corresponding dimensions can be performed by dragging and dropping the title column of Total Appraised Price C to the upper most part of the horizontal frame with a pointer. In this example, the purchase rate in the cell (360) where the Total Appraised Price (330) intersects with Risk Preference (310) is highest at (350), as shown by the color coding. Accordingly, by superimposing one column over the remaining columns, the matrix is modified to represent three dimensions in a two-dimensional interface.

Figure 4:
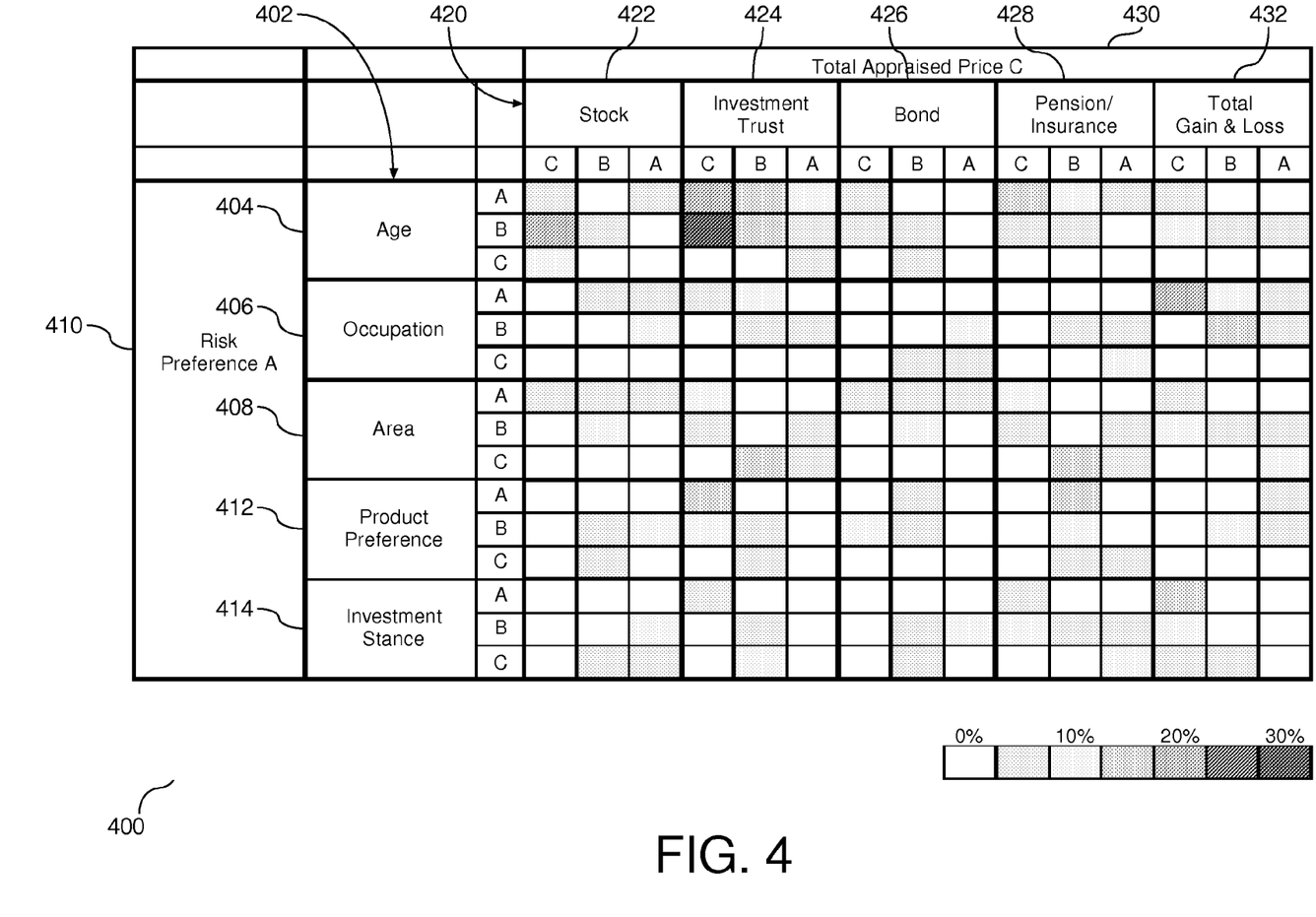
FIG. 4 is a block diagram of the matrix of FIG. 2 with the horizontal axis representing two dimensions and the vertical axis representing two dimensions.

In addition to creating a superimposition in the horizontal direction, the user can select the option of superimposing data from the matrix in vertical direction, the horizontal direction, or both the horizontal and vertical directions in a single matrix. FIG. 4 is a block diagram (400) illustrating an example of the sample matrix (200) of FIG. 2, with four dimensional spaces each including the horizontal axis representing two dimensions and the vertical axis representing two dimensions. The following five types of dimensions are shown on the vertical axis (402): age (404), occupation (406), area (408), product preference (412), and investment stance (414). Similarly, the following five types of dimensions are shown on the horizontal axis (420): stock (422), investment trust (424), bond (426), pension/insurance (428), and total gain and loss (432). In addition, the dimension of the total appraised price (430) has been applied to each dimension on the horizontal axis (420) through the AND logical operator, and the dimension risk preference (410) has been applied to each dimension on the vertical axis (402) through the AND logical operator. The horizontal axis (420) represents a state in which the ANDs of Total Appraised Price C and the other dimensions are performed, and the vertical axis (402) represents a state in which the ANDs of the Risk Performance A and the other dimensions are performed. In one embodiment, the ANDs of the corresponding dimensions can be performed by dragging and dropping the title column of Total Appraised Price C to the upper most part of the horizontal frame with a pointer. A similar action can be performed on Risk Performance A. Accordingly, by superimposing in both the horizontal and vertical directions, each space in the matrix represents two dimensions on the horizontal axis and two dimensions on the vertical axis.

Figure 5:
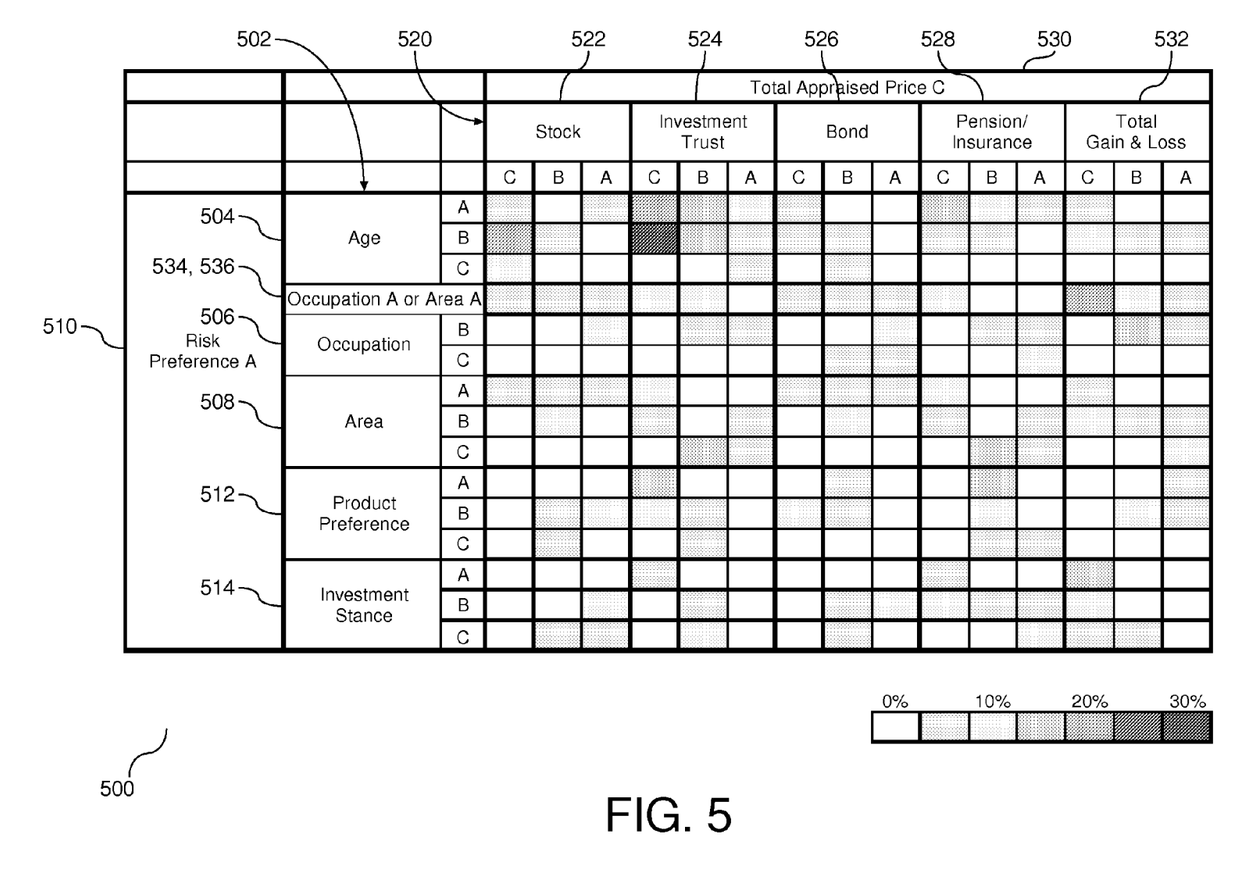
FIG. 5 is a block diagram of the matrix of FIG. 4 with application of an OR logical operator.

As shown above, the AND logical operator may be used to superimpose dimensions along the horizontal and vertical axis of a two dimensional data matrix to enable each cell in the matrix to represent more than two dimensions of data. In addition to the AND logical operator, the OR logical operator may be employed to manipulate the data in a two dimensional matrix. FIG. 5 is a block diagram (500) illustrating an example of the sample matrix (400) of FIG. 4, with an OR logical operator. As shown, FIG. 5 is a block diagram (500) illustrating an example of the sample matrix (200) of FIG. 2, with four dimensional spaces each including the horizontal axis representing two dimensions and the vertical axis representing two dimensions. The following five types of dimensions are shown on the vertical axis (502): age (504), occupation (506), area (508), product preference (512), and investment stance (514). Similarly, the following five types of dimensions are shown on the horizontal axis (520): stock (522), investment trust (524), bond (526), pension/insurance (528), and total gain and loss (532). As in FIG. 4, the dimension of the total appraised price (530) has been applied to each dimension on the horizontal axis (520) through the AND logical operator, and the dimension risk preference (510) has been applied to each dimension on the vertical axis (502) through the AND logical operator. In addition, in this example the OR logical operator is applied to Occupation A (534) and Area A (536) on the vertical axis (502). In the example shown herein, the data on the vertical axis can be executed with the following sample user interface:

Risk Preference A (AND) ((Occupation A (OR) Area A)

Figure 6:
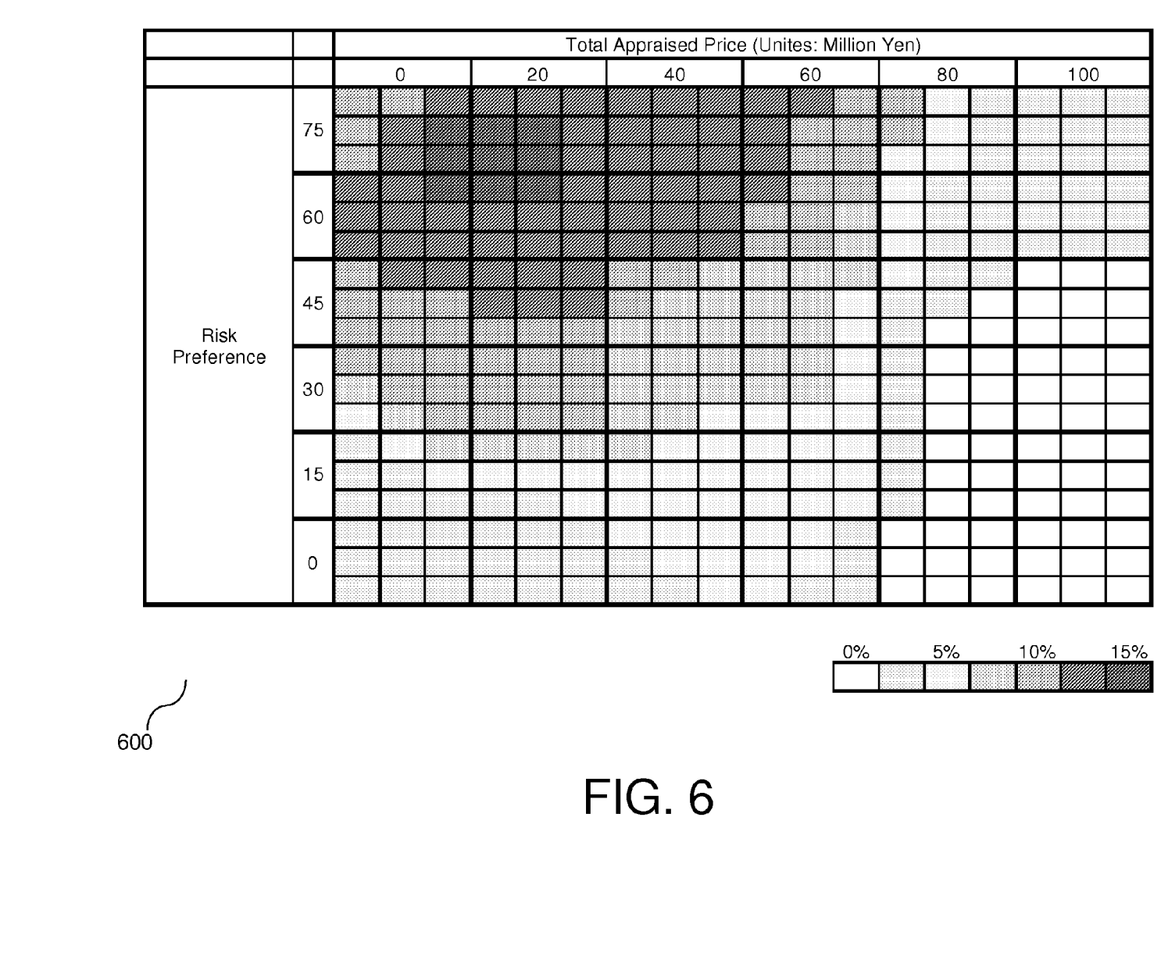
FIG. 6 is a block diagram of a drilled down a two-dimensional space from a two dimensional matrix.

In each of the examples shown in FIGS. 3, 4, and 5, a selected space in the matrix can be drilled to provide access to relational and multi-dimensional data. To drill data is to display the data in detail in any two-dimensional space. In one embodiment, the user can drill down the data to examine and/or work on the data on a more refined and detailed level. FIG. 6 is a block diagram (600) illustrating an example of drilling down a two-dimensional space including total values and risk preferences. When the drill down procedure is performed on a two dimensional space in the states shown in FIGS. 4 and 5, the details of three-dimensional spaces and four-dimensional spaces are displayed, respectively.

As shown in each of the above described matrixes, data is displayed in each cell in the matrix by color coding individual cells according to a corresponding amount of data. In one embodiment, specific numerical figures can be displayed in the individual cells so that color information representing analog information can be supplemented with numerical information representing digital information in which the numerical information can be extended over multiple lines to provide detailed information. Furthermore, in one embodiment raw data can be presented in each cell in the matrix in the form of a scatter diagram, which is a graph used in statistics to visually display and compare two or more sets of related quantitative, or numerical data, by displaying only finitely many points, each having a coordinate on a horizontal and a vertical axis. The use of the scatter diagram format in the matrix cell enables the summarized information represented by the color of the cell and the detailed raw data to be presented at the same time.

Figure 7:
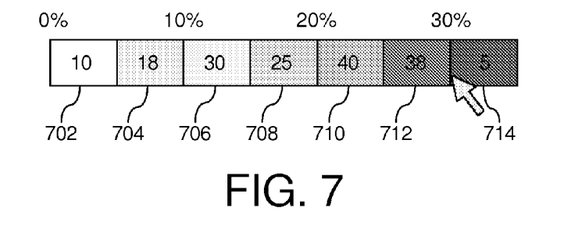
FIG. 7 is a block diagram of the legend.

As shown in the above matrixes of FIG. 2 through FIG. 5, the cells of the matrixes are color coded to represent data, with different colors and/or shades of colors representing different values. In one embodiment, the total amount of data can be displayed in the color cells of the legend. FIG. 7 is a block diagram (700) showing the data in the legend as it applies to quantities in the matrix. As shown, there are seven boxes (702), (704), (706), (708), (710), (712), and (714). Each box has a color and/or a shade of a color. In addition, each box has a number representing the quantity of persons in the matrix that have met the threshold values as represented by the position of the box in the legend. This enables the legend to represent hard data. In one embodiment, the user can change the threshold levels associated with the hard data in the legend. When target analysis is performed for approaching a customer with product sales, the threshold values for color coding can be changed in response to the target number of persons to be approached. For example, when the user needs the information on the top ten persons whose purchase rates are the highest, the color representing the threshold value is modified to indicate the target number of persons. In one embodiment, the threshold value is modified through use of a pointer.

The invention can take the form of a hardware embodiment, a software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 8:
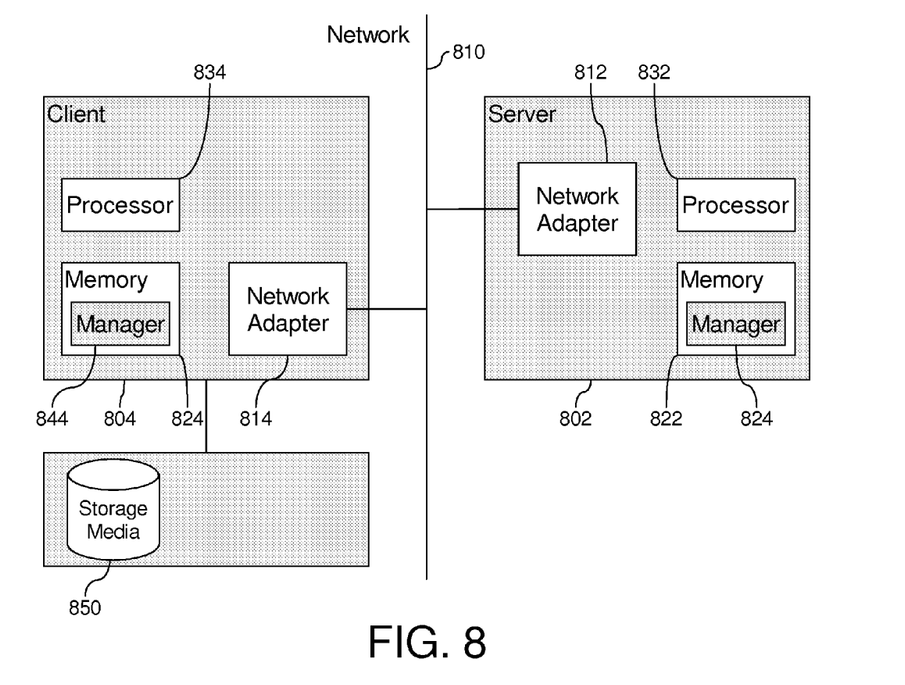
FIG. 8 is a block diagram of a computer system configured to employ a tool for two dimensional data analysis.

In one embodiment, the instructions for data analysis are embodied in a data analysis tool that includes a data manager provided in software or hardware. With respect to the software implementation, the manager may include, but is not limited to, firmware, resident software, microcode, etc. The software implementation can take the form of a computer program product accessible from a computer-useable or computer-readable medium providing program code for use by or in connection with a computer or any instruction execution system. FIG. 8 is a block diagram (800) illustrating placement of the manager in the system hardware. The illustration shows a computer system with a server (802) in communication with a client (804) across a network (810) through network adapters (812) and (814), respectively. Both the server (802) and the client (804) each include memory (822) and (824), respectively, and a processor (832) and (834) respectively. The processors support communication with storage media (850). The client (804) includes a manager (844) embedded therein. As noted above, in one embodiment the manager may be in system software in which case the manager (844) would be embedded within memory (824). The data to be analyzed is preferably installed on storage media (850) on the network (810). Similarly, the server (802) includes a manager (842) embedded therein. The manager (842) may be in system software or hardware. In the case of embedding the manager in system software, the manager (842) is resident on the server memory (822). Similarly, the data analysis tool may be in the form of hardware and/or software. In one embodiment, the data analysis tool resides local to the server (802) and may be accessed by the client (804). Similarly, in one embodiment, the manager (842) may direct execution of instructions to analyze data with use of the AND and/or OR logical operators, and/or manipulation of threshold levels assigned to the legend of an associated matrix.

For the purposes of this description, a computer-useable or computer-readable medium can be any apparatus that can contain, store, or communicate the program for use by or in connection with the instruction execution system, apparatus, or device.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, wireless and Ethernet adapters are just a few of the currently available types of network adapters.

Advantages Over The Prior Art

The two dimensional format of presenting multi-dimensional data supports an intuitive grasp of the distribution of data of three or more dimensions. Different cross section of multi-dimensional cubes are displayed on a visual display in a summarized format so that the user can change combination of dimensions and the method for displaying data. Both of these user supported changes may be executed with a logical operator. Accordingly, the user can readily retrieve intended data from a multi-dimensional space, and may manipulate the data to provide an enhanced study thereof.

Alternative Embodiments

It will be appreciated that, although specific embodiments of the invention have been described herein for purposes of illustration, various modifications may be made without departing from the spirit and scope of the invention. In particular, the distribution of the colors of the cells in the matrix is determined so as to automatically adjust the threshold values for color-coding. This enables the user to readily find a distinctive part of the matrix. In one embodiment, the user can manually adjust the threshold values. When the user needs to change the distribution of colors, the threshold values for color coding can be changed with use of a pointer. Accordingly, the scope of protection of this invention is limited only by the following claims and their equivalents.

We claim:

1. A method for presenting multi-dimensional data comprising:
    a processor in communication with a visual display having a user interface for displaying multi-dimensional data representations in combination as a graphical representation having a single matrix with multiple cells, said matrix having a first side and a second side, wherein each of said sides is divided into at least two portions, each portion representing a different variable;
    each cell representing multi-dimensional data on a two dimensional plane, each axis of each cell associated with at least two dimensions, wherein a first dimension is combined with a second dimension on a first axis with a first logical operator and a third dimension is combined with a fourth dimension on a second axis with a second logical operator so that correlations between all presented dimensions are visualized; and
    the processor applying at least one of the first and second logical operators to at least two dimensions presented in said matrix to superimpose the selected dimensions in a new two dimensional data representation, wherein at least two dimensions are represented in each axis of each cell in the new two-dimensional data representation.

2. The method of claim 1, wherein said logical operators are selected from a group consisting of: AND, OR, and combinations thereof.

3. The method of claim 1, further comprising drilling down individual cells in said matrix so that the cells express respective amounts of data included in the cells.

4. The method of claim 3, further comprising presenting data in each cell in a scatter diagram.

5. The method of claim 3, further comprising color coding the cells.

6. The method of claim 5, further comprising indicating amounts of data for the respective color coded cells in a legend associated with the single matrix and supporting changing of threshold values associated with said colors according to target data.

7. A computer system comprising:
    a processor in communication with storage media;
    a data processing tool in communication with said processor, said data processing tool comprising:
    instructions to display multiple two dimensional data representations in a visual display as a single matrix having multiple cells, said matrix having a first side and a second side, wherein each of said sides is divided into at least two portions, each portion representing a different variable;
    each cell representing multi-dimensional data on a two dimensional plane, each axis of each cell associated with at least two dimensions, wherein a first dimension is combined with a second dimension on a first axis with a first logical operator and a third dimension is combined with a fourth dimension on a second axis with a second logical operator so that correlations between all presented dimensions are visualized; and
    instructions to apply a logical operator to at least one axis of a cell, wherein said instructions superimpose dimensions in a new two dimensional data representation, wherein at least two dimensions are presented in at least one of the axes of each cell in the new two-dimensional data representation.

8. The system of claim 7, wherein said logical operator is selected from a group consisting of: AND, OR, and combinations thereof.

9. The system of claim 7, further comprising instructions to be executed by said tool to drill down individual cells in said matrix so that the cells express respective amounts of data included in the cells.

10. The system of claim 9, further comprising instructions to be executed by said tool to present data in each cell in a scatter diagram.

11. The system of claim 9, further comprising color coding the cells.

12. The system of claim 11, further comprising instructions to be executed by said to indicate amounts of data for the respective color coded cells in a legend associated with the single matrix to support a change of threshold values associated with said colors according to target data.

13. An article comprising:
- a computer readable data storage medium;
- instructions in the medium to display multiple two dimensional summary data representations in combination on a visual display as a single matrix having multiple cells, with each cell containing one of the two-dimensional representations so that correlations between all presented dimensions are visualized, said matrix having a first side and a second side, wherein each of said sides is divided into at least two portions, each portion representing a different variable;
- each cell representing multi-dimensional data on a two dimensional plane, each axis of each cell associated with at least two dimensions, wherein a first dimension is combined with a second dimension on a first axis with a first logical operator and a third dimension is combined with a fourth dimension on a second axis with a second logical operator; and
- instructions in the medium to apply at least one of the first and second logical operators to at least two dimensions of said matrix to superimpose the selected dimensions in a two dimensional data representation, wherein at least two dimensions are presented in each axis of each cell of the two-dimensional data representation.

14. The article of claim 13, wherein said logical operators are selected from a group consisting of: AND, OR, and combinations thereof.

15. The article of claim 13, further comprising instructions in the medium for drilling down individual cells in said matrix so that the cells express respective amounts of data included in the cells.

16. The article of claim 15, further comprising instructions in the medium for presenting data in each cell in a scatter diagram.

17. The article of claim 15, further comprising color coding the cells.

18. The article of claim 17, further comprising instructions in the medium for indicating amounts of data for the respective color coded cells in a legend associated with the single matrix and supporting changing of threshold values associated with said colors according to target data.

\* \* \* \* \*